(12) United States Patent
Malik et al.

(10) Patent No.: US 11,127,056 B2
(45) Date of Patent: Sep. 21, 2021

(54) SYSTEM AND METHOD FOR DETERMINING AT LEAST ONE DEMAND RESPONSE OVERHEAD PERCENTAGE

(71) Applicant: Honda Motor Co., Ltd., Tokyo (JP)

(72) Inventors: Maira A. Malik, Oakland, CA (US); Robert M. Uyeki, Torrance, CA (US); Scott Bergonzi, Redondo Beach, CA (US)

(73) Assignee: Honda Motor Co., Ltd., Tokyo (JP)

( * ) Notice: Subject to any disclaimer, the term of this patent is extended or adjusted under 35 U.S.C. 154(b) by 438 days.

(21) Appl. No.: 15/827,026

(22) Filed: Nov. 30, 2017

(65) Prior Publication Data

US 2019/0164203 A1    May 30, 2019

(51) Int. Cl.
| G06Q 30/02 | (2012.01) |
| G06F 16/903 | (2019.01) |
| G06F 16/909 | (2019.01) |
| G06Q 50/06 | (2012.01) |

(52) U.S. Cl.
CPC ....... *G06Q 30/0283* (2013.01); *G06F 16/909* (2019.01); *G06F 16/90335* (2019.01); *G06Q 50/06* (2013.01)

(58) Field of Classification Search
CPC .......................... G06Q 30/0283; G06Q 50/06
USPC ........................................................ 705/412
See application file for complete search history.

(56) References Cited

U.S. PATENT DOCUMENTS

| 7,747,739 | B2 | 6/2010 | Bridges et al. |
| 7,844,370 | B2 | 11/2010 | Pollack et al. |
| 7,928,693 | B2 | 4/2011 | Hafner et al. |
| 7,949,435 | B2 | 5/2011 | Pollack et al. |
| 8,116,915 | B2 | 2/2012 | Kempton |
| 8,412,654 | B2 | 4/2013 | Montalvo |
| 8,898,278 | B2 | 11/2014 | Bridges et al. |
| 8,965,669 | B2 | 2/2015 | Fisher et al. |
| 8,996,196 | B2 | 3/2015 | Nakazawa |
| 9,002,761 | B2 | 4/2015 | Montalvo |
| 9,026,347 | B2 | 5/2015 | Gadh et al. |
| 9,171,256 | B2 | 10/2015 | Mohagheghi et al. |
| 9,274,540 | B2 | 3/2016 | Anglin et al. |
| 9,290,104 | B2 | 3/2016 | Gadh et al. |
| 9,412,515 | B2 | 8/2016 | Hyde et al. |
| 9,452,685 | B2 | 9/2016 | Hyde et al. |
| 9,476,725 | B2 | 10/2016 | Fisher et al. |
| 9,674,771 | B2 | 6/2017 | Bridges et al. |
| 9,718,371 | B2 | 8/2017 | Anglin et al. |

(Continued)

OTHER PUBLICATIONS

Madina et al., "Methodology for assessing electric vehicle charging infrastructure business models", Energy Policy 89, 284, 293, (Year: 2016).*

(Continued)

*Primary Examiner* — Emmett K. Walsh
(74) *Attorney, Agent, or Firm* — Rankin Hill & Clark LLP

(57) ABSTRACT

A system and method for determining at least one demand response overhead percentage that include receiving at least one demand response signal. The system and method also include analyzing event data to determine at least one event. The system and method additionally include determining the at least one demand response overhead percentage based on the event data. The system and method further include communicating the demand response overhead percentage to at least one electric vehicle.

18 Claims, 6 Drawing Sheets

(56) References Cited

U.S. PATENT DOCUMENTS

| | | |
|---|---|---|
| 9,766,671 B2 | 9/2017 | Dorn et al. |
| 2009/0043520 A1 | 2/2009 | Pollack et al. |
| 2013/0096751 A1* | 4/2013 | Riley ................. B60L 3/12 |
| | | 701/22 |
| 2013/0103378 A1 | 4/2013 | Tinnakornsrisuphap et al. |
| 2014/0184170 A1* | 7/2014 | Jeong ............... B60L 11/1844 |
| | | 320/137 |
| 2014/0203077 A1 | 7/2014 | Gadh et al. |
| 2015/0039391 A1* | 2/2015 | Hershkovitz ...... G06Q 30/0202 |
| | | 705/7.31 |
| 2016/0086292 A1* | 3/2016 | Satomi ................ B60L 53/14 |
| | | 705/412 |
| 2017/0010114 A1 | 1/2017 | Fisher et al. |
| 2017/0138758 A1* | 5/2017 | Ricci ................. G01C 21/3697 |
| 2017/0250550 A1 | 8/2017 | Mittakhov et al. |
| 2018/0143035 A1* | 5/2018 | Ricci ..................... A61B 5/01 |

OTHER PUBLICATIONS

Aman, Saima, Prediction Models for Dynamic Demand Response.

\* cited by examiner

SYSTEM AND METHOD FOR DETERMINING AT LEAST ONE DEMAND RESPONSE OVERHEAD PERCENTAGE

BACKGROUND

Currently an open vehicle-grid platform (OVGIP) may provide a demand response program that may incentivize one or more electric vehicle drivers to limit the usage of their respective electric vehicles during one or more high-demand timeframes and increase their usage during one or more low-demand timeframes. The one or more high-demand timeframes may take into account times at which the demand to charge electric vehicles may be high based on certain predetermined times of the day. In many instances an OVGIP may apply a predetermined overhead pricing scheme that may be applied towards electric charging of electric vehicles that may be included as part of the demand response program during the one or more predetermined high-demand timeframes. The predetermined overhead pricing scheme may be static in nature for an entire duration of the predetermined period of time and may apply generally to all electric vehicles that take part in the demand response program.

BRIEF DESCRIPTION

According to one aspect, a computer-implemented method for determining at least one demand response overhead percentage that includes receiving at least one demand response signal. At least one demand response overhead pricing scheme that is implemented in at least one location during at least one timeframe is determined based on the at least one demand response signal. The computer-implemented method additionally includes analyzing event data to determine at least one event that is occurring at the at least one location during the at least one timeframe. The computer-implemented method also includes determining the at least one demand response overhead percentage based on the event data. The at least one demand response overhead percentage may be determined to accommodate the at least one demand response overhead pricing scheme within a surrounding vicinity of the at least one event. The method further includes communicating the demand response overhead percentage to at least one electric vehicle.

According to another aspect, a system for determining at least one demand response overhead percentage that includes a memory storing instructions when executed by a processor cause the processor to receive at least one demand response signal. At least one demand response overhead pricing scheme that is implemented in at least one location during at least one timeframe is determined based on the at least one demand response signal. The instructions additionally cause the processor to analyze event data to determine at least one event that is occurring at the at least one location during the at least one timeframe. The instructions also cause the processor to determine at least one demand response overhead percentage based on the event data. The at least one demand response overhead percentage may be determined to accommodate the at least one demand response overhead pricing scheme within a surrounding vicinity of the at least one event. The instructions further cause the processor to communicate the demand response overhead percentage to at least one electric vehicle.

According to still another aspect, a computer readable storage medium storing instructions that when executed by a computer, which includes at least a processor, causes the computer to perform a method that includes receiving at least one demand response signal. At least one demand response overhead pricing scheme that is implemented in at least one location during at least one timeframe is determined based on the at least one demand response signal. The instructions additionally include analyzing event data to determine at least one event that is occurring at the at least one location during the at least one timeframe. The instructions also include determining at least one demand response overhead percentage based on the event data. The at least one demand response overhead percentage may be determined to accommodate the at least one demand response overhead pricing scheme within a surrounding vicinity of the at least one event. The instructions further include communicating the demand response overhead percentage to at least one electric vehicle.

DETAILED DESCRIPTION

Figure 1:
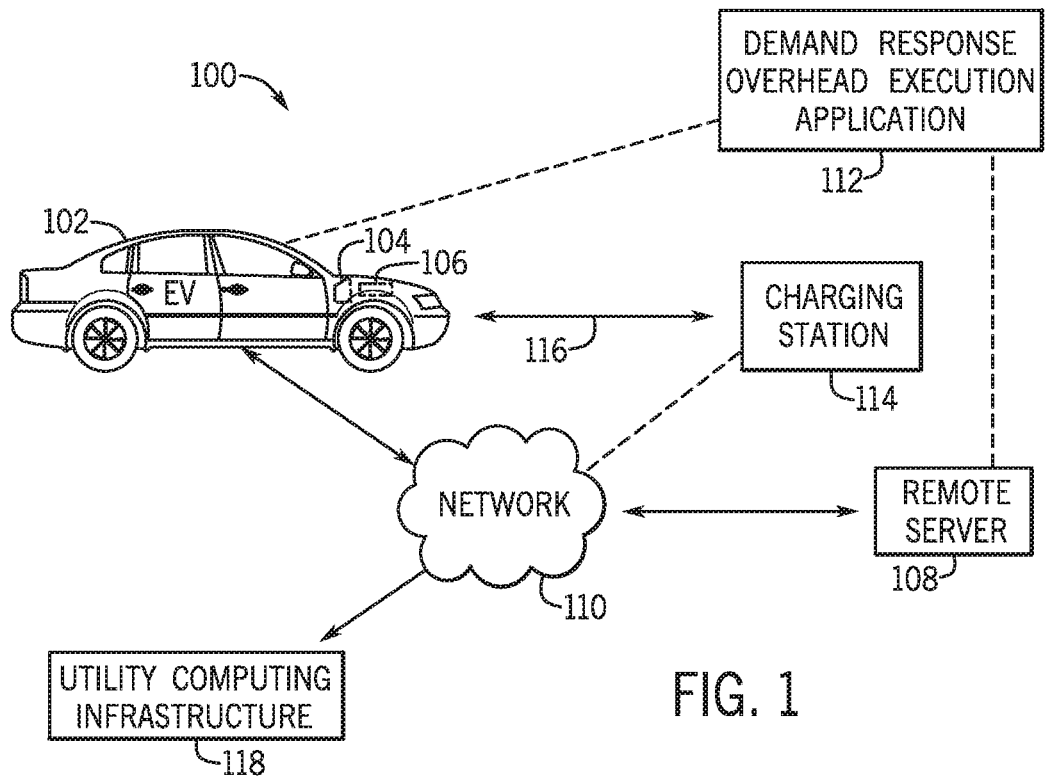
FIG. 1 is a high-level schematic view of an illustrative system 100 for determining at least one demand response overhead percentage according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Controller Area network (CAN), Local Interconnect Network (LIN), among others.

"Computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "computer-readable medium", as used herein, refers to a medium that provides signals, instructions and/or data. A computer-readable medium may take forms, including, but not limited to, non-volatile media and volatile media. Non-volatile media may include, for example, optical or magnetic disks, and so on. Volatile media may include, for example, semiconductor memories, dynamic memory, and so on. Common forms of a computer-readable medium include, but are not limited to, a floppy disk, a flexible disk, a hard disk, a magnetic tape, other magnetic medium, other optical medium, a RAM (random access memory), a ROM (read only memory), and other media from which a computer, a processor or other electronic device may read.

A "data store", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device. The data store can also refer to a database, for example, a table, a set of tables, a set of data stores (e.g., a disk, a memory, a table, a file, a list, a queue, a heap, a register) and methods for accessing and/or manipulating those data in those tables and data stores. The data store can reside in one logical and/or physical entity and/or may be distributed between two or more logical and/or physical entities.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM). The memory can store an operating system that controls or allocates resources of a computing device.

An "operable connection", or a connection by which entities are "operably connected", is one in which signals, physical communications, and/or logical communications can be sent and/or received. An operable connection can include a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "portable device", as used herein, is a computing device typically having a display screen with user input (e.g., touch, keyboard) and a processor for computing. Portable devices include, but are not limited to, key fobs, handheld devices, mobile devices, smart phones, laptops, tablets and e-readers.

An "electric vehicle" (EV), as used herein, refers to any moving vehicle that is capable of carrying one or more human occupants and is powered entirely or partially by one or more electric motors powered by an electric battery. The EV may include battery electric vehicles (BEVs), plug-in hybrid electric vehicles (PHEVs) and extended range electric vehicles (EREVs). The term "vehicle" includes, but is not limited to: cars, trucks, vans, minivans, SUVs, motorcycles, scooters, boats, personal watercraft, and aircraft.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting the same, FIG. 1 is a high-level schematic view of an illustrative system 100 for determining at least one demand response overhead percentage according to an exemplary embodiment of the present disclosure. The components of the system 100, as well as the components of other systems and architectures discussed herein, may be combined, omitted or organized into different architectures for various embodiments.

In the exemplary embodiment of FIG. 1, the system 100 includes an electric vehicle (EV) 102. The EV 102 is powered by an electric motor 104 and an electric storage mechanism, for example, a battery 106. In one embodiment, the EV 102 is purely electric in that it is fully operational based on the operation of the electric motor 104. In other embodiments, the EV 102 may have the electric motor 104 and an internal combustion engine (not shown). In some embodiments, the EV 102 may have any number of electric motors, batteries, and/or internal combustion engines and they may operate in series (e.g., as in an extended range electric vehicle), in parallel, or some combination of series and parallel operation.

In one embodiment, the EV 102 may be enrolled in a demand response program by an owner of the EV 102. The demand response program may be executed between one or more electricity providers (not shown) and customers to adapt to vehicle charging demands to electrical loads of one or more energy providers. The demand response program may be part of an open vehicle-grid platform and may be based on the demand of electricity utilized to charge a plurality of electric vehicles (not shown) that may include the EV 102 within one or more locations. In particular, one or more demand response pricing schemes are implemented by the demand response program. The demand response pricing schemes may be provided to deter the owner/driver from charging the battery 106 of the EV 102 during a high demand period when one or more demand response overhead pricing schemes are initiated for the location of the EV 102. The demand response pricing schemes may also be provided to incentivize the charging of the battery 106 of the EV 102 during a low demand period when one or more demand response discount pricing schemes are initiated for the location of the EV 102.

In an exemplary embodiment, the demand response overhead pricing scheme(s) is provided as a demand response overhead percentage(s) that is applied to a predetermined price of energy at one or more locations during one or more timeframes. Also, the demand response discount pricing scheme(s) is provided as a demand response discount percentage(s) that is applied to a predetermined price of energy at one or more locations during one or more timeframes. More specifically, the demand response overhead percentage(s) and the demand response discount percentage(s) are provided as pricing strategies to provide energy pricing based on the time-of-day the energy is utilized and the location the energy is provided.

The demand response pricing scheme(s) may be based on a current supply-demand load (e.g., grid load), such that the one or more energy providers that may include a facility for generating, transmitting and/or distributing energy to consumers may provide the demand response pricing scheme(s) to ensure that the energy load on a respective power grid owned/operated by the respective energy provider(s) is not overburdened at one or more timeframes based on the demand for charging power to charge the EV 102 and additional electric vehicles (not shown) at one or more particular locations. As discussed below, the system 100 may take into account event data to determine one or more demand response overhead percentages that are dynamic in nature and based on one or more demand response factors associated with one or more events that may be taking place at one or more locations where the demand response overhead pricing scheme(s) are implemented during one or more timeframes when the demand response overhead pricing scheme(s) are implemented.

In one embodiment, the EV 102 may be operatively connected for computer communication to a remote server 108 via a wireless communication network 110. The EV 102 may transmit and receive data (e.g., state of charge data, vehicle location data, demand response data, charging commands/signals) to and from the remote server 108, and vice versa, through the network 110. The remote server 108 may be an external server or a device remote (e.g., off-board) from the EV 102. The system architectures of the EV 102 and the remote server 108 will be discussed in more detail herein with reference to FIGS. 2 and 3.

In an exemplary embodiment, the EV 102 and/or the remote server 108 may store and execute a demand response overhead execution application (DR overhead application) 112. As discussed in more detail below, the DR overhead application 112 may determine (e.g., provide/modify) the demand response overhead percentage(s) based on one or more specific events that may occur during a specific timeframe and a specific location at which the demand response overhead is being applied. The one or more specific events may include, but may not be limited to, day-to-day events (e.g., business hours of a particular business, school, mall, church) and special events (e.g., sporting events, movie showings, concerts).

As discussed below, the DR overhead application 112 may acquire event data from the remote server 108 and may determine one or more demand response overhead percentages that may be applied based on the event data associated with one or more events that may occur within the location and during the timeframes in which the demand response overhead pricing scheme(s) is implemented. The DR overhead application 112 may determine a specific location of the event from the event data and may analyze one or more of location data, timeframe data, historical data, attendance data, and/or environmental data associated with the event(s) to determine the one or more demand response overhead percentages. Upon determining the one or more demand response overhead percentages, the DR overhead application 112 may communicate the demand response overhead percentage(s) to the EV 102 upon determining the EV 102 may be located within a surrounding vicinity of the event(s) (e.g., within 15 miles of the event).

The application 112 may allow the demand response percentage to be modified from one location to another based on the existence of one or more events at each of the locations that may influence the vehicle charging demands on electrical loads of one or more electricity providers. More specifically, the DR overhead application 112 allows the electricity provider(s) to provide one or more demand response overhead percentages that may vary based on the existence of the event(s), the type of event(s), the location of the event(s), the expected attendance of the event(s), historical data associated with the event(s) that may include historical traffic patterns near the event(s), and environmental data such as weather/road conditions near the event(s).

As an illustrative example, the application 112 may determine numerous demand overhead percentages that are applied around an event. For instance, the application 112 may analyze the event data and may determine a 25% overhead for a period of time prior to the start of an event when traffic is high as attendees of the event are traveling towards the location of the event, 17% for a period of time during the duration of the event during which the demand response overhead pricing scheme(s) is in effect, and 30% for a period of time after the completion of the event when traffic is high as attendees of the event are traveling away from the location of the event. This functionality may ensure that one or more overhead percentages may be provided that are dynamic based on the dynamic demand for charging energy that may occur based on the dynamic traffic patterns associated with the event and surrounding the vicinity of the event instead of providing a general demand response overhead percentage that is static (15%) and is applied strictly based on the time-of-day the energy is utilized and the location the energy is provided to charge the battery 106 of the vehicle 102. Additionally, this functionality may ensure that the demand response overhead pricing scheme(s) are subjectively applicable to a subset of one or more electric vehicles and/or one or more charging stations that are located within the surrounding environment of the event rather than generally within a broader location in which the overhead pricing scheme(s) are generally applied based on the location the energy is provided.

With continued reference to FIG. 1, the system 100 may further include one or more charging stations 114 that may connect to the EV 102 via a charging link(s) 116. In particular, the charging station(s) 114 may be utilized to charge the battery 106 of the EV 102 through the charging link(s) 116 at one or more locations at which the demand response program may apply. Generally, the charging station(s) 114 may include a respective processor (not shown), a respective memory (not shown), a respective disk (not shown), and a respective input/output (I/O) interface (not shown), which are each operably connected for computer communication via a respective bus (not shown) and the charging link(s) 116. The I/O interfaces provide software and hardware to facilitate data input and output between the components of the charging station(s) 114 and other components, networks, and data sources, of the system 100.

In one or more embodiments, the charging station(s) 114 may be located within a predetermined vicinity of one or more events and may be operably connected for computer communication with the remote server 108, for example, to transmit and receive data (e.g., demand response pricing scheme data including demand response overhead percentage data and demand response discount percentage data) to and from the remote server 108. In particular, the application 112 may communicate with the determined demand response overhead percentage(s) to the charging station(s) 114. Upon receiving the demand response overhead percentage(s), the charging station 114 may communicate the demand response overhead percentage(s) (e.g., through a display screen (not shown)) that may be provided to the driver/owner of the EV 102 prior to providing charging energy to the vehicle 102. This may enable the driver/owner of the EV 102 which is participating in the demand response program to be informed of the demand response overhead percentage(s) prior to initiating charging of the EV 102.

In one embodiment, the EV 102 and/or the remote server 108 may receive and transmit data through the network 110 to a utility computing infrastructure 118. The utility computing infrastructure 118 may include one or more computing devices (not shown) that may communicate with the one or more energy providers. In particular, the utility computing infrastructure 118 may receive perspective and/or real-time price data that may be provided by each respective energy provider to communicate different utility rates (e.g., price per kWh). The utility computing infrastructure 118 may additionally receive demand response pricing schemes from the one or more energy providers that may apply to one or more locations and one or more timeframes. As discussed, the demand response pricing schemes may pertain to demand response discount pricing schemes and/or demand response overhead pricing schemes that may be applied based on the time-of-day the energy is utilized and the location the energy is provided (e.g., a region, a county, a city) to charge the battery 106 of the EV 102.

In one embodiment, the remote server 108 may receive one or more demand response signals that are communicated by the utility computing infrastructure 118 to the remote server 108. The one or more demand response signals may each include data that pertains to the demand response overhead pricing scheme(s) and/or the demand response discount pricing scheme(s) that may be applied during one or more timeframes at one or more locations. As discussed below, the DR overhead application 112 may analyze the demand response signal(s) to determine if the signal(s) is pertaining to a demand response overhead pricing scheme(s) that may be implemented by the one or more energy providers within one or more locations and during one or more timeframes (generally provided based on the time-of-day the energy is utilized and the location the energy is provided to charge the battery 106 of the vehicle 102).

Figure 2:
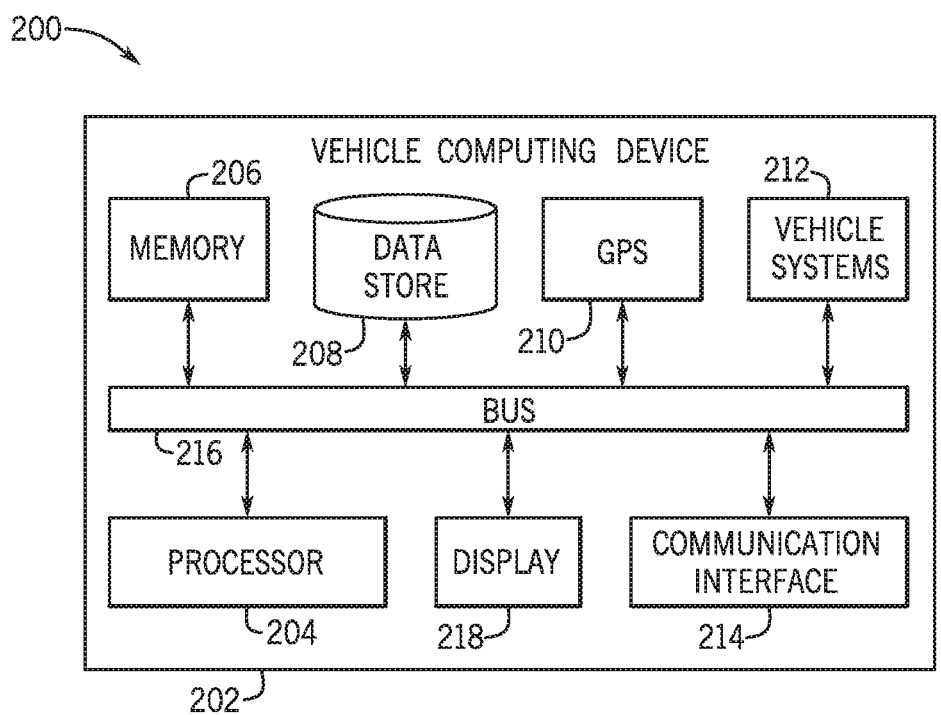
FIG. 2 is a schematic view of an illustrative electric vehicle architecture according to an exemplary embodiment of the present disclosure.

Referring now to FIG. 2, a schematic view of an illustrative electric vehicle architecture 200, for example the EV 102 of FIG. 1, is shown according to an exemplary embodiment of the present disclosure. In particular, the EV 102 may include a vehicle computing device 202 (e.g., a telematics unit, an electronic control unit) with provisions for processing, communicating and interacting with various components of the EV 102 and other components of the system 100. The vehicle computing device 202 may include a processor 204, a memory 206, a data store 208, a position determination device 210 (GPS), a plurality of vehicle systems 212 (e.g., including the electric motor 104, the battery 106) and a communication interface 214. The components of the architecture 200, including the vehicle computing device 202, may be operably connected for computer communication via a bus 216 (e.g., a Controller Area Network (CAN) or a Local Interconnect Network (LIN) protocol bus) and/or other wired and wireless technologies. The vehicle computing device 202 as well as the EV 102 may include other components and systems not shown.

In one embodiment, the data store 208 of the EV 102 may store application data that may also include data pertaining to the DR overhead application 112. The communication interface 214 of the EV 102 may provide software, firmware and/or hardware to facilitate data input and output between the components of the vehicle computing device 202 and other components, networks and data sources. Further, the communication interface 214 may facilitate communication with external resources through the wireless communication network 110 such as the remote server 108, the charging station 114, and/or the utility computing infrastructure 118. For example, the communication interface 214 may facilitate communication with the remote server 108 to obtain one or more demand response overhead percentages as determined by the application 112 to be communicated to the driver of the EV 102 via a display 218 (e.g., a head unit, a display stack, a heads-up display) in the EV 102. The display 218 may be operably controlled to communicate the demand response overhead percentage(s) as determined by the DR overhead application 112 through one or more application user interfaces that may be included as a human machine interface(s) for the application 112.

Figure 3:
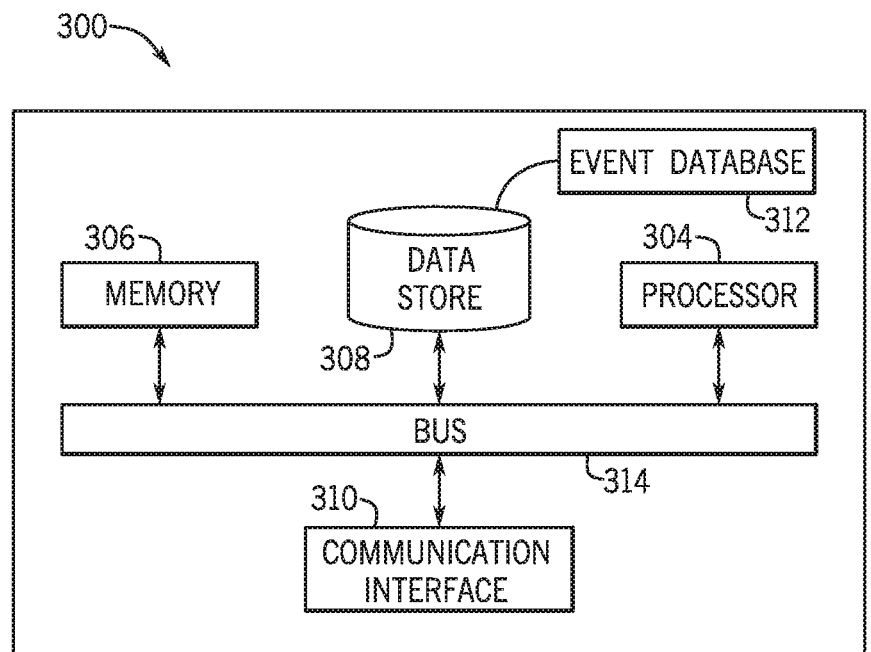
FIG. 3 is a schematic view of an illustrative remote server architecture according to an exemplary embodiment of the present disclosure.

Referring now to FIG. 3, a schematic view of an illustrative remote server architecture 300, for example the remote server 108 of FIG. 1, is shown according to an exemplary embodiment of the present disclosure. The remote server 108, is located remotely (i.e., off-board) from the EV 102 (FIG. 1) and, in some embodiments may be maintained by a third party such as an Original Equipment Manufacturer (OEM) (e.g., of the EV 102), one or more energy providers, a regulatory body, among others. Additionally, in some embodiments, the remote server 108 may be another type of remote device or supported by a cloud architecture. In FIG. 3, the remote server 108 may include a computing device 302 that may further include a processor 304, a memory 306, a data store 308 and a communication interface 310. The components of the architecture 300, including the computing device 302, may be operably connected for computer communication via a bus 314 and/or other wired and wireless technologies. The computing device 302 as well as the remote server 108 may include other components and systems not shown.

In an exemplary embodiment, the communication interface 310 of the remote server 108 may provide software, firmware and/or hardware to facilitate data input and output between the components of the processor 304, the memory 306 and other components, networks and data sources associated with the remote server 108. Further, the communication interface 310 may be utilized to communicate with the EV 102 and/or one or more third party data providers (not shown) through the network 110 to maintain an event database 312 that is stored on the data store 308.

In an exemplary embodiment, the event database 312 may include event data that may be associated with various events. The event data may be populated by/from the third party provider(s) (not shown) that may include, but may not be limited to, organizations, businesses, traffic/transportation authorities, entertainment promoters, ticket sale promotors, venue operators, internet search providers, weather data providers, media outlets, sports franchises, concert providers, and the like that may provide event information and associated information related to one or more events that may occur within the location in which the demand response program may be applied. For example, a venue operator and a ticket sale promotor may provide event information pertaining to a sporting event that is occurring at a specific venue. In one or more embodiments, the event data may include, but may not be limited to, an address of the event, the timeframe (approximate start time, approximate end time, average duration) of the event, the expected attendance of the event, the environmental data associated with the event such as weather during the event, day light during the event that may affect traffic patterns, historical data associated with the event (e.g., traffic flows in areas surrounding the event during past instances of the event).

In some embodiments, the event data included within the event database 312 may additionally be populated by a plurality of electric vehicles including the EV 102. In particular, the event database 312 may be populated with data pertaining to driving patterns that may be provided by the EV 102 and additional electric vehicles to be analyzed and be stored on the event database 312 to establish events based on driving patterns. More specifically, the remote server 108 may communicate with the EV 102 to obtain driving patterns and prior destinations from the GPS 210 of the EV 102 and may determine day-to-day event data based on data provided by the EV 102 and (e.g., numerous) additional electric vehicles. For example, such data may be used to determine a specific location and timeframes of a particular business at which the driver of the EV 102 may be employed that include peak business hours and off-peak business hours of the business and an address of the business that may be utilized to determine one or more overhead percentages based on the event data surrounding the operation of the business.

II. Demand Response Overhead Execution Application

The DR overhead application 112 and its components will now be discussed in more detail according to an exemplary embodiment, and with continued reference to FIGS. 1-3. In one or more embodiments, the DR overhead application 112 may be executed by the vehicle computing device 202 of the EV 102 and/or the computing device 302 of the remote server 108. Data may be sent or received from the DR overhead application 112 to/from the components of the EV 102, the remote server 108, the charging station(s) 114, the charging link(s) 116, and/or the utility computing infrastructure 118.

As discussed in more detail below, demand response signal(s) may be communicated from the utility computing infrastructure 118 and analyzed by the DR overhead application 112 to determine if the demand response signal(s) is pertaining to a demand response overhead pricing scheme(s) that should be applied within a particular location(s) and at a particular timeframe(s). Upon determining that the demand response overhead pricing scheme(s) should be applied, the application 112 may communicate with the event database 312 to retrieve the event data that may be associated with one or more events that are occurring within the particular location(s) and at the particular timeframe(s) to further determine one or more demand response overhead percentages that are based on the event data.

Figure 4:
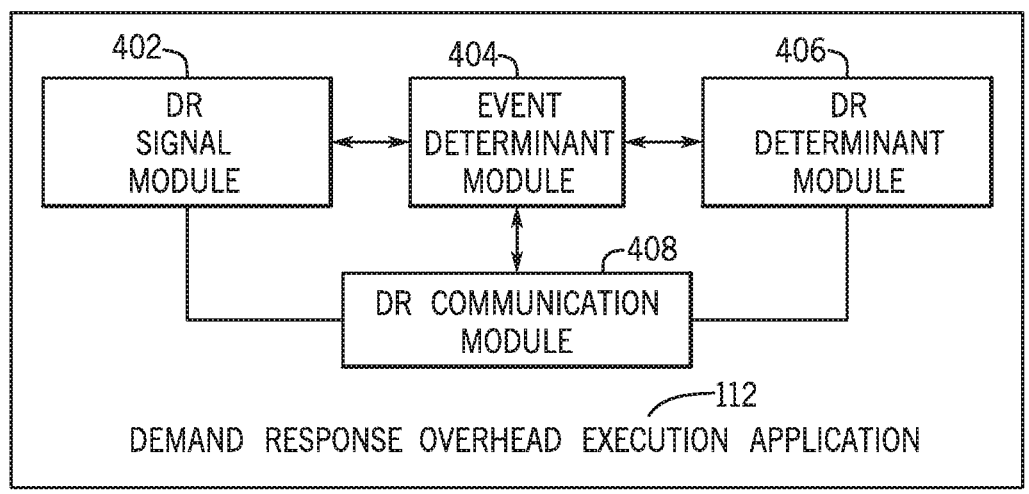
FIG. 4 is a schematic view of an illustrative demand response overhead execution application according to an exemplary embodiment of the present disclosure.

Referring to FIG. 4, a schematic view of an illustrative demand response overhead execution application 112 according to an exemplary embodiment of the present disclosure, the DR overhead application 112 may include various modules to determine one or more demand response overhead percentages based on event data associated with one or more events that are occurring within the particular location(s) and the particular timeframe(s) of the demand response overhead pricing scheme(s). In an exemplary embodiment, the DR overhead application 112 may include a demand response signal analysis module (DR signal module) 402, an event determinant module 404, a demand response overhead percentage determinant module (DR determinant module) 406, and a demand response overhead percentage communication module (DR communication module) 408.

In one embodiment, the DR signal module 402 may be utilized to analyze one or more demand response signals that are communicated from the utility computing infrastructure 118. As discussed above, one or more energy providers may communicate demand response pricing schemes that may be applied during one or more timeframes at one or more locations. Upon receiving the demand response pricing schemes, the DR signal module 402 may communicate the demand response signal(s) to the remote server 108 and/or the EV 102. The demand response signal(s) may include data associated with the demand response pricing schemes, including, but not limited to, a predetermined demand response overhead percentage and/or a predetermined demand response discount percentage that should be applied during the timeframe(s) at the location(s).

As discussed below, upon the receipt of the demand response signal(s) by the remote server 108 and/or the EV 102, the DR signal module 402 may analyze the demand response signal(s) to determine if the demand response signal(s) is pertaining to a demand response overhead pricing scheme(s) that may be applied during one or more timeframes at one or more locations. In particular, the DR signal module 402 may analyze the demand response signal(s) to determine the geo-location(s) of the demand response overhead pricing scheme(s) and the timeframe(s) of the demand response overhead pricing scheme(s). In one embodiment, the demand response signal(s) may additionally include a predetermined demand response overhead percentage(s) (e.g., default percentage of 15%) that may also be included within the demand response signal(s) that may be analyzed and determined by the DR signal module 402.

Upon determining the timeframe(s) and the geo-location(s) in which the demand response overhead pricing scheme(s) may be applied based on the demand response signal(s), the DR signal module 402 may communicate respective data to the event determinant module 404. In some embodiments, if the demand response signal(s) also includes the predetermined demand response overhead percentage(s), the DR signal module 402 may communicate the predetermined demand response overhead percentage(s) to the DR determinant module 406.

In an exemplary embodiment, the event determinant module 404 of the DR overhead application 112 may evaluate the geo-location(s) and the timeframe(s) in which the demand response overhead pricing scheme(s) may be applied as communicated by the DR signal module 402. Upon evaluating the geo-location(s) and the timeframe(s) in which the demand response overhead pricing scheme(s) may be applied, the event determinant module 404 may access the event database 312 stored on the data store 308 of the remote server 108 and may communicate with the remote server 108 to obtain event data. In particular, the event determinant module 404 may analyze the event data to determine at least one event that is occurring (e.g., will occur) within the geo-location(s) and during the timeframe(s) of in which the demand response overhead pricing scheme(s) may be applied.

As discussed below, upon determining the at least one event that is occurring within the geo-location(s) of the demand response overhead pricing scheme(s) and during the timeframe(s) of the demand response overhead pricing scheme(s), the DR determinant module 406 may analyze event data associated to the at least one event. In particular, the DR determinant module 406 may analyze one or more of locational data, timeframe data, historical data, attendance data, and/or environmental data associated to the at least one event to determine one or more demand response factors.

In an exemplary embodiment, the one or more demand response factors may include values (e.g., 1-100 values) that pertain to an expected vehicle charging demands to electrical loads within a surrounding vicinity (e.g., 10 mile vicinity) of the at least one event that is occurring within the location(s) and timeframe(s) in which the demand response overhead pricing scheme(s) is taking place. In particular, the demand response factors may include a point-based value system that may pertain to number of vehicles within the surrounding vicinity of the at least one event that may indicate an electric load that may be expected or may occur within the surrounding vicinity of the at least one event.

Additionally, the demand response factors may include the point-based value system that may indicate the (expected) movement of vehicles within the surrounding vicinity of the at least one event and environmental conditions that may affect the movement (e.g., traffic flow) of the electric vehicles that may influence the need of the EV 102 and additional electric vehicles to be recharged (at one or more frequencies) within the surrounding vicinity of the at least one event. In some embodiments, each of the one or more demand response factors may be provided with respect to one or more timeframes in which at least one event occurs. For example, the event determinant module 404 may determine demand response factors associated with one or more timeframes before the start of the at least one event, one or more time frames during the course of the at least one event, and one or more timeframes after the completion of the at least one event.

As an illustrative example, a special event such as a professional football game may attract a large number of people that may be traveling within a large number of electric vehicles within a surrounding vicinity of a stadium. The event determinant module 404 may analyze one or more of locational data, timeframe data, historical data, attendance data, and/or environmental data associated with the football game to determine a geo-location of the stadium, the timeframe of the game itself, historical data associated with traffic patterns near the stadium based on past football games, attendance data with respect to the expected number of people traveling to the stadium based on ticket sales, and environmental data associated with the weather/road conditions near the stadium. This data may influence the number of vehicles including electric vehicles on the roadways within the surrounding vicinity of the stadium and may be utilized to determine the demand response factor(s) associated with the professional football game.

In one or more embodiments, upon determining the demand response factor(s) associated with the event(s) occurring with the location(s) and at the timeframe(s) of the demand response overhead pricing scheme(s), the event determinant module 404 may communicate respective data associated with the demand response factor(s) to the DR determinant module 406 of the DR overhead application 112. In an exemplary embodiment, the DR determinant module 406 may analyze the demand response overhead factor(s) and may determine a demand response overhead percentage(s) for one or more timeframes prior to the start of the at least one event. Additionally, the DR determinant module 406 may analyze the demand response overhead factor(s) and may determine a demand response overhead percentage(s) for one or more periods of time after the completion of the event. The demand response overhead percentage(s) may be determined by the DR determinant module 406 to accommodate a demand response(s) as provided by the one or more electric providers at the one or more locations during the one or more timeframes.

In some embodiments, if the DR signal module 402 communicates data associated with the predetermined demand response overhead percentage as communicated within the demand response signal(s) by the utility computing infrastructure 118, the DR determinant module 406 may adjust the predetermined demand response overhead percentage (e.g., default percentage of 15%) upwards and/or downwards based on the timeframe(s) in which the demand response overhead percentage(s) is determined.

With continued reference to the illustrative example, discussed above, the DR determinant module 406 may analyze the demand response factor(s) associated with the professional football game as determined by the event determinant module 404. Upon analyzing the demand response factor(s), the DR determinant module 406 may determine a demand response overhead percentage of 20% within three hours prior to the start of the game, 25% within two hours prior to the start of the game, and 30% within the hour prior to the start of the game based on the increase in traffic within the surrounding vicinity of the stadium, expected attendance of the game, and/or the environmental conditions within the surrounding vicinity of the stadium. Within the illustrative example, the DR determinant module 406 may determine a demand response overhead percentage of 5% (down from 25% prior to the game) during the duration of the game that may be based on the decreased traffic within the surrounding vicinity of the stadium as the attendees of the game are located within the stadium and off of one or more roads within the surrounding vicinity of the stadium.

In an exemplary embodiment, upon determining one or more demand response overhead percentages associated with the at least one event, the DR determinant module 406 may communicate respective data to the DR communication module 408. The DR communication module 408 of the DR overhead application 112 may communicate the one or more demand response overhead percentages to the DR communication module 408. In one embodiment, the DR communication module 408 may communicate with the communication interface 214 of the EV 102 to send one or more data signals that include the one or more overhead percentages if it is determined that the EV 102 may be located within the surrounding vicinity of the at least one event.

In particular, the DR communication module 408 may communicate with the communication interface 214 to obtain GPS data associated with the EV 102 from the GPS 210 to determine a potential destination, a potential travel path, and/or a historical travel pattern of the EV 102 that may be utilized to determine that the EV 102 may be located (e.g., may be driven) within the surrounding vicinity of the at least one event during one or more timeframes in which the demand response overhead pricing scheme(s) is applied. If it is determined that the EV 102 may be located within the surrounding vicinity of the at least one event during the timeframe(s) in which the demand response overhead percentage(s) may be applied, the DR communication module 408 may communicate with the communication interface 214 of the EV 102 to send one or more data signals that include the one or more overhead percentages to the vehicle computing device 202. In one embodiment, upon receiving the one or more data signals, the vehicle computing device 202 may analyze the one or more data signals and may operably control the display 218 of the EV 102 to communicate the demand response overhead percentage(s) as determined by the DR overhead application 112 through one or more application user interfaces that may be included as the human machine interface(s) for the application 112 to the driver of the EV 102.

In another embodiment, the DR communication module 408 may communicate with the one or more charging stations 114 that are determined as being located within the surrounding vicinity of the at least one event. In particular, the DR communication module 408 may communicate with the utility computing infrastructure 118 to obtain a listing of one or more charging stations 114 within the geo-location(s) in which the demand response overhead pricing scheme(s) are being implemented that is recorded and stored by the one or more electric providers. The DR communication module 408 may analyze the listing of the one or more charging stations 114 and may determine one or more charging stations 114 that are located within the surrounding vicinity of the at least one event.

Upon determining the one or more charging stations 114 located within the surrounding vicinity of the at least one event, the DR communication module 408 may communicate with the charging station(s) 114 and/or the charging link(s) 116 to send one or more data signals that include the one or more overhead percentages to the charging station(s) 114. In one embodiment, upon receiving the one or more data signals, the processor of the charging station(s) 114 may analyze the demand response signal(s) and may communicate the demand response overhead percentage(s) (e.g., through a display screen (not shown)) that may be provided to the driver/owner of the EV 102 prior to providing charging energy to the vehicle 102. This may enable the driver/owner of the EV 102 to be informed of the demand response overhead percentage(s) prior to initiating charging of the EV 102 via the charging station(s) 114.

The functionality of the DR overhead application 112 may ensure that when the one or more electric providers institutes the demand response overhead pricing scheme(s) that it is provided and/or adjusted to appropriately account for the number of vehicles within the surrounding vicinity of the at least one event that may indicate a vehicle charging load that may be expected or may occur within the surrounding vicinity of the event. Additionally, the functionality of the application 112 may ensure that the (expected) movement of vehicles within the surrounding vicinity of the at least one event and environmental conditions that may affect the movement (e.g., traffic flow) of the electric vehicles that may influence the need of the EV 102 and additional electric vehicles to be recharged is taken into account when providing the demand response overhead percentage(s). In other words, the application 112 may ensure that when the demand response overhead pricing scheme(s) is implemented for the timeframe(s) and the location(s) that includes the at least one event, the demand response overhead percentage(s) may be increased or decreased at one or more timeframes associated with the at least one event to adapt to vehicle charging demands to the electrical loads of the one or more energy providers utilized to charge a plurality of electric vehicles within the surrounding vicinity of the event.

III. Methods Related to the Demand Response Overhead Execution Application

Figure 5:
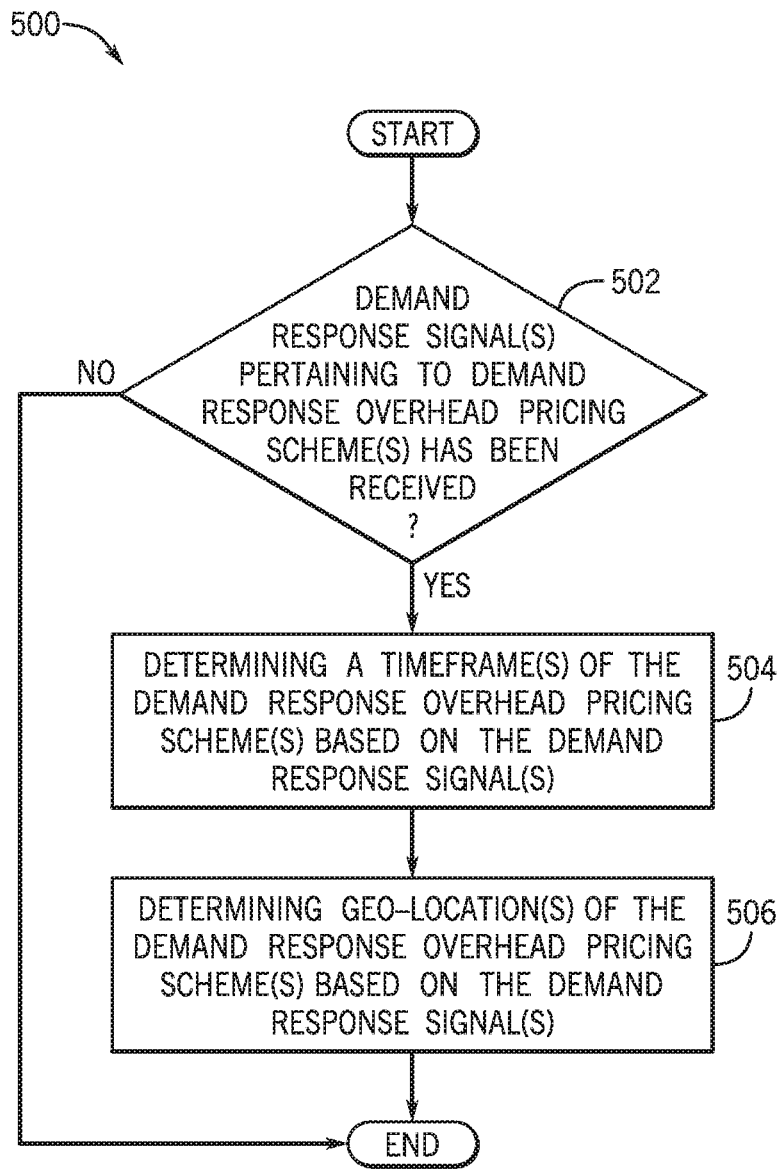
FIG. 5 is a process flow diagram of a method for receiving and analyzing at least one demand response signal according to an exemplary embodiment of the present disclosure.

FIG. 5 is a process flow diagram of a method 500 for receiving and analyzing at least one demand response signal according to an exemplary embodiment of the present disclosure. FIG. 5 will be described with reference to the components of FIGS. 1-4, though it is to be appreciated that the method 500 of FIG. 5 may be used with other system and/or components. The method 500 may begin at block 502, wherein the method 500 may include determining if one or more demand response signals pertaining to one or more demand response overhead pricing schemes has been received.

In an exemplary embodiment, the DR signal module 402 may receive data associated with one or more demand response data signals that may be communicated to the communication interface 310 of the remote server 108 and/or the communication interface 214 of the EV 102. As discussed above, the demand response data signal(s) may be communicated from the utility computing infrastructure 118 based on the implementation of one or more demand response pricing schemes by one or more energy providers. Upon receiving data pertaining to the demand response data signal(s), the DR signal module 402 may analyze the data and may determine if the demand response signal(s) pertain to the demand response overhead pricing scheme(s).

If it is determined that the demand response signal(s) pertaining to the demand response overhead pricing scheme(s) has been received (at block 502), the method 500 may proceed to block 504, wherein the method 500 may include determining a timeframe(s) of the demand response overhead pricing scheme(s) based on the demand response signal(s). In one embodiment, upon receiving the data associated pertaining to the demand response data signal(s), the DR signal module 402 may analyze the data and determine one or more timeframe(s) during which the one or more demand response overhead pricing schemes may be applied. In other words, the DR signal module 402 may determine one or more periods of time during which the one or more energy providers may implement the demand response overhead pricing scheme(s) to provide the demand response overhead percentage(s) that is applied to a predetermined price of energy.

The method 500 may proceed to block 506, wherein the method 500 may include determining the geo-location(s) of the demand response overhead pricing scheme(s) based on the demand response signal(s). In an exemplary embodiment, the DR signal module 402 may additionally analyze the data pertaining to the demand response signal(s) and may determine one or more locations in which the one or more demand response overhead pricing schemes may be applied during the one or more timeframes (as determined at block 504).

In one embodiment, upon receiving the location information, the DR signal module 402 may communicate with the vehicle computing device 202 to determine the geo-location(s) of the one or more locations in which the one or more demand response overhead pricing schemes may be applied. More specifically, the GPS 210 of the EV 102 may provide a plurality of locational coordinates (GPS, DGPS) that may include the location(s) in which the demand response overhead pricing schemes may be applied.

In an exemplary embodiment, upon determining the timeframe(s) during which the demand response overhead pricing scheme(s) and the location(s) in which the demand response pricing scheme(s) may be applied, the DR signal module 402 may communicate respective data to the event determinant module 404. As discussed below, this data may be utilized to determine one or more events that may occur within the one or more locations during the one or more timeframes to further determine at least one demand response overhead percentage based on event data associated with the event(s).

Figure 6:
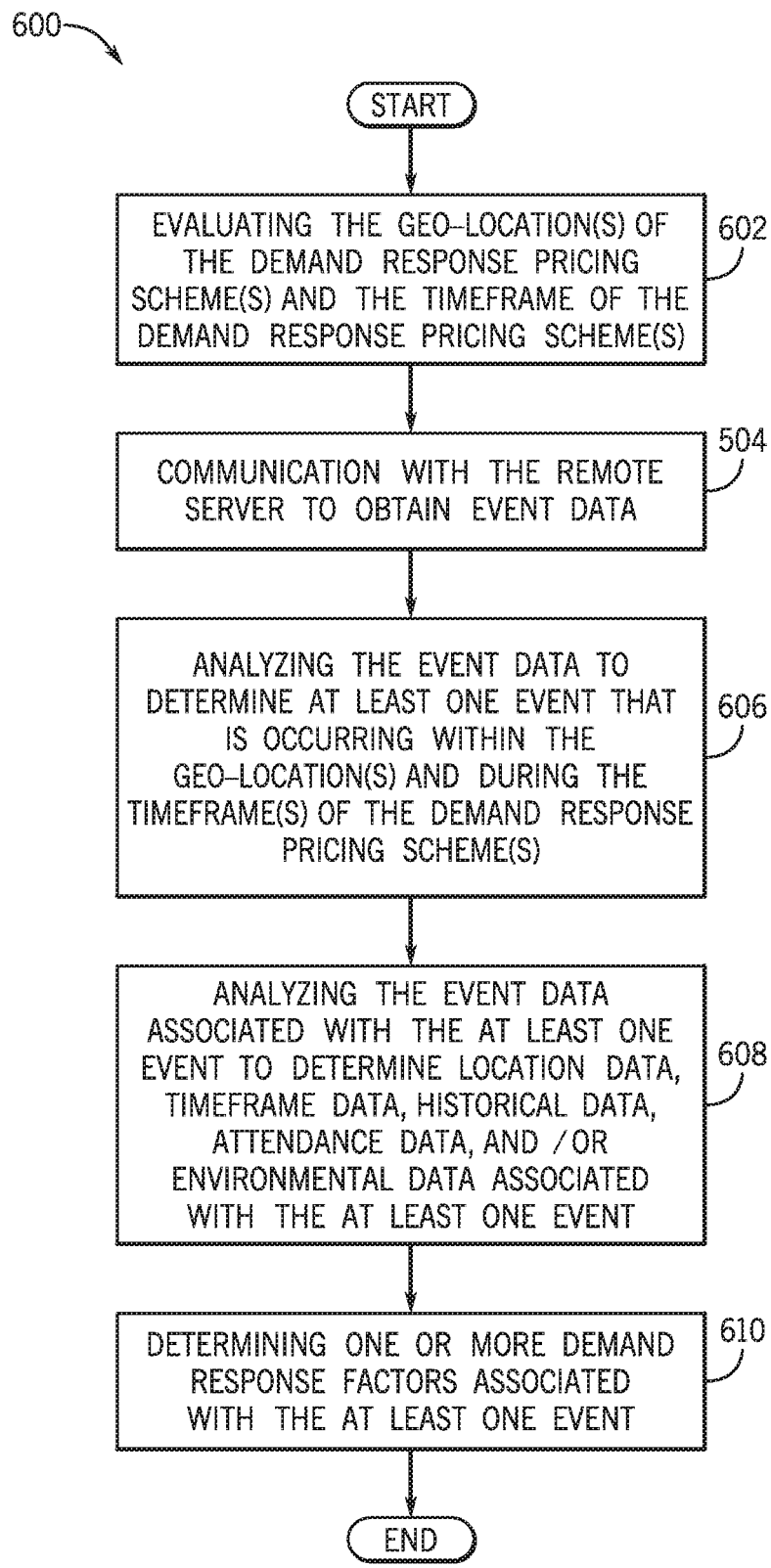
FIG. 6 is a process flow diagram of a method for analyzing event data to determine at least one event that is occurring according to an exemplary embodiment of the present disclosure.

FIG. 6 is a process flow diagram of a method 600 for analyzing event data to determine at least one event that is occurring according to an exemplary embodiment of the present disclosure. FIG. 6 will be described with reference to the components of FIGS. 1-4, though it is to be appreciated that the method 600 of FIG. 6 may be used with other system and/or components. The method 600 may begin at block 602, wherein the method 600 may include evaluating the geo-location(s) and the timeframe(s) of the demand response pricing scheme(s). In an exemplary embodiment, upon receiving the data associated with the timeframe(s) during which the demand response overhead pricing scheme(s) may be implemented and the geo-location(s) in which the demand response overhead pricing scheme(s) may be implemented, the event determinant module 404 may evaluate the timeframe(s) and the geo-location(s). In particular, the event determinant module 404 may evaluate the timeframe(s) and the geo-location(s) to determine one or more locations (e.g., districts) that are included within the geo-location(s) (e.g., city) and one or more timeslots (e.g., 1:00 PM-4:30 PM) that may be occur within the timeframe(s) (e.g., 10 AM-6 PM).

The method 600 may proceed to block 604, wherein the method 600 may include communicating with the remote server 108 to obtain event data. As discussed above, the event database 312 stored on the data store 308 of the remote server 108 may include event information. As discussed, the event information may include, but may not be limited to, an address of the event, the timeframe (approximate start time, approximate end time, average duration) of the event, the expected attendance of the event, the environmental data associated with the event such as weather during the event, day light during the event that may affect traffic patterns, and/or historical data associated with the event. In one embodiment, upon evaluating the geo-location(s) and the timeframe(s) of the demand response pricing scheme(s), the event determinant module 404 may query the event database 312 with data associated to the geo-location(s) and timeframe(s) of the demand response pricing scheme(s) to obtain event data, as discussed below.

The method 600 may proceed to block 606, wherein the method 600 may include analyzing the event data to determine at least one event that is occurring within the geo-location(s) and the timeframe(s) of the demand response pricing scheme(s). In an exemplary embodiment, upon communicating with the remote server 108 to obtain the event data, the event determinant module 404 may query the event database 312 to obtain event data associated with one or more events that are occurring within the geo-locations and during the timeframe(s) of the demand response pricing scheme(s).

More specifically, the event determinant module 404 may access the data store 308 and may query the event database 312 to determine one or more events that include a location (e.g., by address, by GPS coordinates) that are included within the geo-location(s) in which the demand response pricing scheme(s) may be implemented. Additionally, the event determinant module 404 may query the event database 312 to determine if the one or more events that include a location that are included within the geo-location(s) are occurring within one or more timeslots that are included within the timeframe(s) during which the demand response overhead pricing scheme(s) may be implemented at the particular geo-location(s). Upon querying the event database 312, the event determinant module 404 may determine at least one event that is occurring within the geo-location(s) in which the demand response overhead pricing scheme(s) may be implemented during the timeframe(s) during with the demand response overhead pricing scheme(s) may be implemented.

The method 600 may proceed to block 608, wherein the method 600 may include analyzing the event data associated with the at least one event to determine location data, timeframe data, historical data, attendance data, and environmental data associated with the at least one event. As discussed above, the event data associated with one or more respective events may be populated by/from the third party provider(s) to provide one or more of locational data, time frame data, historical data, attendance data, and/or environmental data associated to the at least one event that may included within the event data associated to the at least one event.

In one embodiment, the event determinant module 404 may analyze such data to determine a geo-location of the physical location of the at least one event, the timeframe (e.g., start time, duration, end time) of the at least one event, historical data associated with traffic patterns and number of vehicles within the surrounding vicinity of the location in which the at least one event is occurring, attendance data with respect to the expected number of people attending the at least one event, and environmental data associated with the weather/road conditions within the surrounding vicinity of the location in which the at least one event is occurring. This data may influence the number of vehicles including electric vehicles on the roadways within the surrounding vicinity of the location in which the at least one event is occurring and may be utilized to determine the demand response factor(s) associated with the at least one event.

The method 600 may proceed to block 610, wherein the method 600 may include determining one or more demand response factors associated with the at least one event. In one embodiment, upon analyzing the event data (at block 608), the event determinant module 404 may determine one or more demand response factors associated with the at least one event. The one or more demand response factors may be determined based on the analysis of the location data, timeframe data, historical data, attendance data, and/or environmental data determined from the analysis of the event data (discussed above at block 608). In an exemplary embodiment, the demand response factor(s) may include values that pertain to expected vehicle charging demands to electrical loads of one or more energy providers within the surrounding vicinity of the at least one event that is determined to occur within the geo-location(s) and the timeframe(s) of the demand response pricing scheme(s).

As discussed above, the demand response factors may include a point-based value system that may pertain to number of vehicles within the surrounding vicinity of the at least one event that may indicate an electric load that may be expected or may occur within the surrounding vicinity of the at least one event. The demand response factors may additionally include the point-based value system that may indicate the (expected) movement of vehicles within the surrounding vicinity of the at least one event and environmental conditions may affect the movement (e.g., traffic flow) of the electric vehicles that may influence the need of the EV 102 and additional electric vehicles to be recharged (at one or more frequencies) within the surrounding vicinity of the at least one event. In one embodiment, upon determining the one or more demand response factors associated with the at least one event, the event determinant module 404 may communicate respective data to the DR determinant module 406 to further determine one or more demand response overhead percentage(s) to be implemented within the surrounding vicinity of the at least one event.

Figure 7:
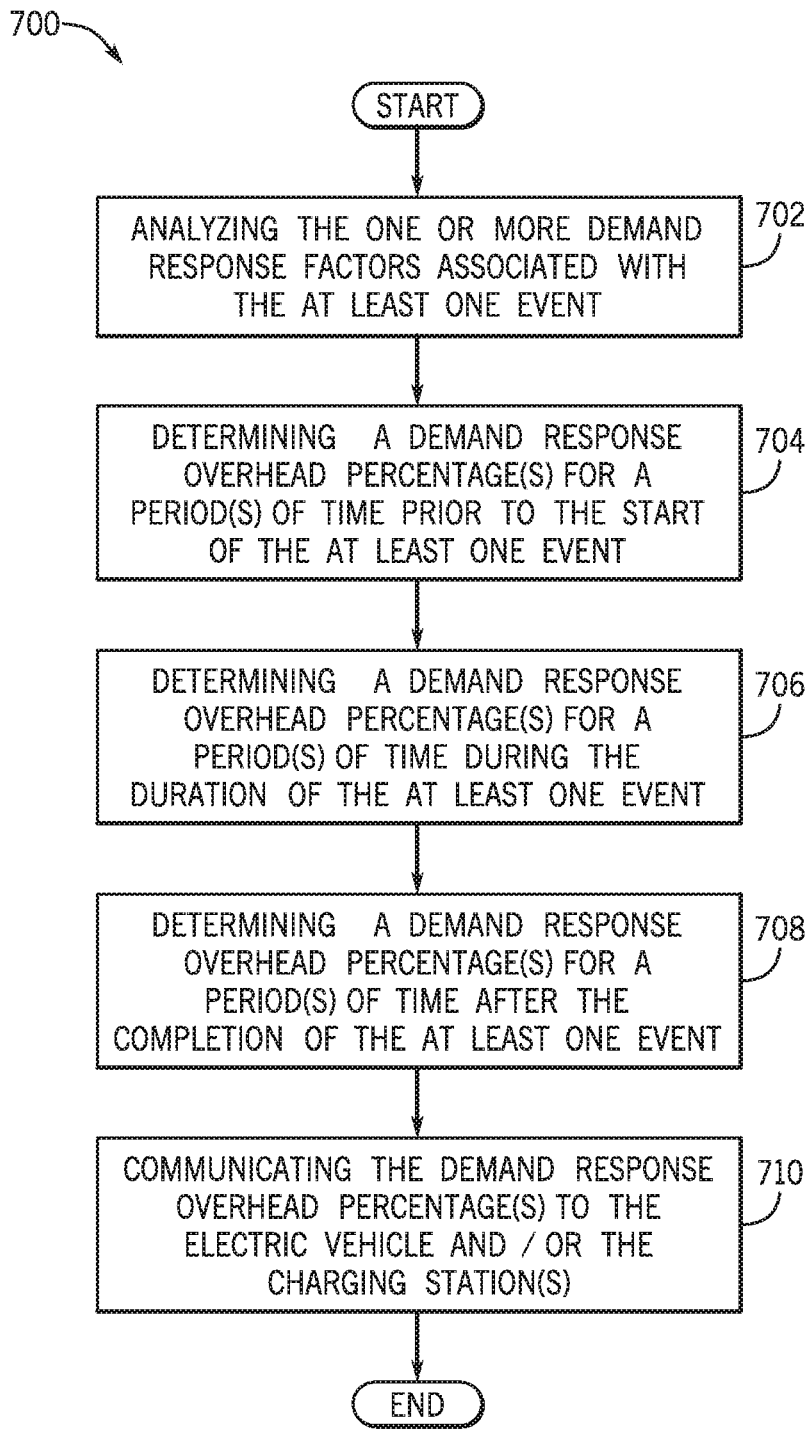
FIG. 7 is a process flow diagram of a method for determining and communicating the at least one demand response overhead percentage according to an exemplary embodiment of the present disclosure.

FIG. 7 is a process flow diagram of a method 700 for determining and communicating at least one demand response overhead percentage according to an exemplary embodiment of the present disclosure. FIG. 7 will be described with reference to the components of FIGS. 1-4, though it is to be appreciated that the method 700 of FIG. 7 may be used with other system and/or components. The method 700 may begin at block 702, wherein the method 700 may include analyzing the one or more demand response factors associated with the at least one event.

In an exemplary embodiment, upon receiving data associated with the demand response factor(s) from the event determinant module 404, the DR determinant module 406 may analyze the one or more demand response factors to determine expected vehicle charging demands to electrical loads within the surrounding vicinity of the at least one event that is determined to occur within the geo-location(s). Additionally, the DR determinant module 406 may analyze the demand response factor(s) to determine the timeframe(s) of the demand response pricing scheme(s) and movement of vehicles within the surrounding vicinity of the at least one event and environmental conditions that may affect the movement of the electric vehicles that may influence the need of the EV 102 and additional electric vehicles to be recharged within the surrounding vicinity of the at least one event.

The method 700 may proceed to block 704, wherein the method 700 may include determining one or more demand response overhead percentages for one or more periods of time prior to the start of the at least one event. In an exemplary embodiment, upon analyzing the demand response factor(s) associated with the event, the DR determinant module 406 may determine one or more demand response overhead percentages that may be implemented during one or more periods of time prior to the start of the at least one event. The one or more demand response overhead percentages may account for (expected) vehicle charging demands to electrical loads due to increased traffic that may occur at one or more time periods closer to the start of the at least one event.

The method 700 may proceed to block 706, wherein the method 700 may include determining a demand response overhead percentage(s) for one or more periods of time during the duration of the at least one event. In an exemplary embodiment, upon analyzing the demand response factor(s) associated with the event, the DR determinant module 406 may also determine one or more demand response overhead percentages that may be implemented for one or more time periods during the duration of the at least one event. The one or more demand response overhead percentages may account for vehicle charging demands to electrical loads due to (expected) decreased traffic and possibly increased vehicle charging that may occur as the attendees of the event are attending the event and not traveling. Additionally, the one or more demand response overhead percentages may account for vehicle charging demands to electric loads due to (expected) increased traffic and decreased vehicle charging at one or more time periods closed to the completion of the at least one event.

The method 700 may proceed to block 708, wherein the method 700 may include determining a demand response overhead percentage(s) for a period(s) of time after the completion of the at least one event. In an exemplary embodiment, upon analyzing the demand response factor(s) associated with the event, the DR determinant module 406 may determine one or more demand response overhead percentages that may be implemented during one or more periods of time upon/after the completion of the at least one event. The one or more demand response overhead percentages that may account for (expected) vehicle charging demands to electrical loads due to increased traffic that may occur at one or more time periods after the completion of the at least one event.

The method 700 may proceed to block 710, wherein the method 700 may include communicating the demand response overhead percentage(s) to the EV 102 and/or the charging station(s) 114. In an exemplary embodiment, upon determining the one or more demand response overhead percentages, the DR determinant module 406 may communicate respective data to the DR communication module 408. In one embodiment, the DR communication module 408 may analyze the received data and may communicate the respective demand response overhead percentages to the EV 102 and/or the charging station(s) 114.

As discussed above, the DR communication module 408 may communicate with the communication interface 214 of the EV 102 to send one or more data signals that include the one or more overhead percentages if it is determined that the EV 102 may be located within the surrounding vicinity of the at least one event. In particular, the DR communication module 408 may communicate with the communication interface 214 to obtain GPS data associated with the EV 102 from the GPS 210 to determine a potential destination, a potential travel path, and/or a historical travel pattern of the EV 102 that may be utilized to determine that the EV 102 may be located (e.g., may be driven) within the surrounding vicinity of the at least one event during the timeframe(s) in which the demand response overhead percentage(s) may be applied. If it is determined that the EV 102 may be located within the surrounding vicinity of the at least one event during one or more timeframes during which the demand response overhead percentage(s) may be applied, the DR communication module 408 may communicate with the communication interface 214 of the EV 102 to send one or more data signals that include the one or more overhead percentages to the vehicle computing device 202.

In one or more embodiments, the DR communication module 408 may also communicate with the one or more charging stations 114 that are determined as being located within the surrounding vicinity of the at least one event. In particular, the DR communication module 408 may communicate with the utility computing infrastructure 118 to obtain the listing of one or more charging stations 114 within the geo-location(s) in which the demand response overhead pricing scheme(s) are being implemented that is recorded and stored by the one or more electric providers. The DR communication module 408 may analyze the listing of the one or more charging stations 114 and may determine one or more charging stations 114 that are located within the surrounding vicinity of the at least one event. Upon determining the one or more charging stations 114 located within the surrounding vicinity of the at least one event, the DR communication module 408 may communicate with the charging station(s) 114 and/or the charging link(s) 116 to send one or more data signals that include the one or more overhead percentages to the charging station(s) 114.

Figure 8:
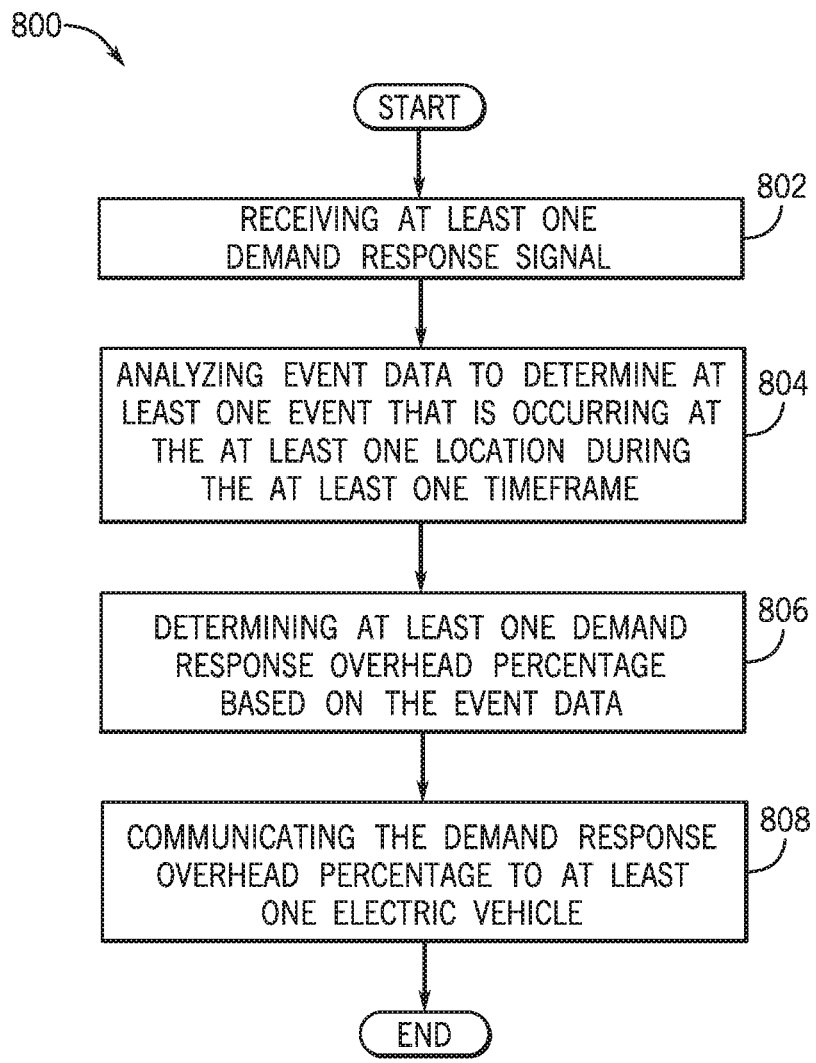
FIG. 8 is a process flow diagram of a method for determining the at least one demand response overhead percentage according to an exemplary embodiment of the present disclosure.

FIG. 8 is a process flow diagram of a method 800 for determining at least one demand response overhead percentage according to an exemplary embodiment of the present disclosure. FIG. 8 will be described with reference to the components of FIGS. 1-4, though it is to be appreciated that the method 800 of FIG. 8 may be used with other system and/or components. The method 800 may begin at block 802, wherein the method 800 may include receiving at least one demand response signal. In one embodiment, the at least one demand response signal is analyzed to determine at least one demand response overhead pricing scheme that applies to at least one location during at least one timeframe.

The method 800 may proceed to block 804, wherein the method 800 may include analyzing event data to determine at least one event that is occurring at the least one location during the at least one timeframe. The method 800 may proceed to block 806, wherein the method 800 may include determining at least one demand response overhead percentage based on the event data. In one embodiment, the at least one demand response overhead percentage may be determined to accommodate the at least one demand response overhead pricing scheme that is associated with the at least one event. The method 800 may proceed to block 808, wherein the method 800 may include communicating the demand response percentage to at least one EV 102.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for determining at least one demand response overhead percentage, comprising:

receiving at least one demand response signal from a utility computing infrastructure, wherein the at least one demand response signal includes electronic data that pertains to at least one demand response overhead pricing scheme that is implemented in at least one location during at least one timeframe;

analyzing event data that is associated with a plurality of types of day-to-day events and a plurality of types of special events to determine at least one event that is occurring at the at least one location during the at least one timeframe and to determine at least one demand response factor that is associated with the at least one event, wherein the event data is retrieved based on an electronic query of an event database and includes location data, timeframe data, historical data, attendance data, and environmental data associated with the at least one event, wherein the at least one demand response factor includes at least one value that pertains to expected vehicle charging demands to an energy load of at least one energy provider within a surrounding vicinity of the at least one event;

determining the at least one demand response overhead percentage that is applied to a predetermined price of energy during at least one timeframe and with respect to at least one location, wherein the at least one demand response overhead percentage is determined based on the at least one demand factor associated with the at least one event, wherein the at least one demand response overhead percentage is determined to accommodate the at least one demand response overhead pricing scheme within the surrounding vicinity of the at least one event;

receiving location information from at least one electric vehicle;

determining that the at least one electric vehicle is to be located within the surrounding vicinity of the at least one event during the at least one timeframe in which the at least one demand response overhead percentage is applied, wherein the determination is based on the received location information; and in response to determining that the at least one electric vehicle is to be located within the surrounding vicinity of the at least one event during the at least one timeframe in which the at least one demand response overhead percentage is applied, communicating the demand response overhead percentage to the at least one electric vehicle, wherein a display of the at least one electric vehicle is operably controlled to present the demand response overhead percentage through at least one application user interface.

2. The computer-implemented method of claim 1, wherein the event data is associated with the at least one event that is occurring within the at least one location in which the at least one demand response overhead pricing scheme is implemented and during the at least one timeframe in which the at least one demand response overhead pricing scheme is implemented.

3. The computer-implemented method of claim 2, wherein analyzing the event data to determine the at least one event that is occurring includes querying the event database with data associated with the at least one location in which the at least one demand response overhead pricing scheme is implemented and the at least one timeframe during which the at least one demand response overhead pricing scheme is implemented to retrieve the event data that is associated with the plurality of types of day-to-day events and the plurality of types of special events.

4. The computer-implemented method of claim 1, wherein analyzing the event data to determine the at least one event that is occurring includes analyzing the event data that is populated by organizations, businesses, transportation authorities, entertainment promotors, ticket sale promotors, venue operators, internet search providers, weather data providers, media outlets, sports franchises, and concert providers to determine at least one of: the location data, the timeframe data, the historical data, the attendance data, and the environmental data associated with the at least one event.

5. The computer-implemented method of claim 1, wherein the event data pertains to driving patterns that are provided by at least one electric vehicle, wherein the driving patterns are analyzed to determine the at least one event that includes a day-to-day event.

6. The computer-implemented method of claim 1, wherein determining the at least one demand response overhead percentage includes analyzing the at least one demand response factor associated with the at least one event and determining the at least one demand response overhead percentage for at least one period of time prior to a start of the at least one event.

7. The computer-implemented method of claim 1, wherein determining the at least one demand response overhead percentage includes analyzing the at least one demand response factor associated with the at least one event and determining the at least one demand response overhead percentage for at least one period of time during a duration of the at least one event.

8. The computer-implemented method of claim 1, wherein determining the at least one demand response overhead percentage includes analyzing the at least one demand response factor associated with the at least one event and determining the at least one demand response overhead percentage for at least one period of time after a completion of the at least one event.

9. A system for determining at least one demand response overhead percentage, comprising:
 a memory storing instructions when executed by a processor cause the processor to:
 receive at least one demand response signal from a utility computing infrastructure, wherein the at least one demand response signal includes electronic data that pertains to at least one demand response overhead pricing scheme that is implemented in at least one location during at least one timeframe;
 analyze event data that is associated with a plurality of types of day-to-day events and a plurality of types of special events to determine at least one event that is occurring at the at least one location during the at least one timeframe and to determine at least one demand response factor that is associated with the at least one event, wherein the event data is retrieved based on an electronic query of an event database and includes location data, timeframe data, historical data, attendance data, and environmental data associated with the at least one event, wherein the at least one demand response factor includes at least one value that pertains to expected vehicle charging demands to an energy load of at least one energy provider within a surrounding vicinity of the at least one event;
 determine at least one demand response overhead percentage that is applied to a predetermined price of energy during at least one timeframe and with respect to at least one location, wherein the at least one demand response overhead percentage is determined based on the at least one demand factor associated with the at least one event, wherein the at least one demand response overhead percentage is determined to accommodate the at least one demand response overhead pricing scheme within the surrounding vicinity of the at least one event;
 receive location information from at least one electric vehicle;
 determine that the at least one electric vehicle is to be located within the surrounding vicinity of the at least one event during the at least one timeframe in which the at least one demand response overhead percentage is applied, wherein the determination is based on the received location information; and
 in response to determining that the at least one electric vehicle is to be located within the surrounding vicinity of the at least one event during the at least one timeframe in which the at least one demand response overhead percentage is applied, communicate the demand response overhead percentage to at least one electric vehicle, wherein a display of the at least one electric vehicle is operably controlled to present the demand response overhead percentage through at least one application user interface.

10. The system of claim 9, wherein the event data is associated with the at least one event that is occurring within the at least one location in which the at least one demand response overhead pricing scheme is implemented and during the at least one timeframe in which the at least one demand response overhead pricing scheme is implemented.

11. The system of claim 10, wherein analyzing the event data to determine the at least one event that is occurring includes querying the event database with data associated with the at least one location in which the at least one demand response overhead pricing scheme is implemented and the at least one timeframe during which the at least one demand response overhead pricing scheme is implemented to retrieve the event data that is associated with the plurality of types of day-to-day events and the plurality of types of special events wherein the event data associated with the at least one event is retrieved from the event database.

12. The system of claim 9, wherein analyzing the event data to determine the at least one event that is occurring includes analyzing the event data that is populated by organizations, businesses, transportation authorities, entertainment promotors, ticket sale promotors, venue operators, internet search providers, weather data providers, media outlets, sports franchises, and concert providers to determine at least one of: the location data, the timeframe data, the historical data, the attendance data, and the environmental data associated with the at least one event.

13. The system of claim 9, wherein the event data pertains to driving patterns that are provided by at least one electric vehicle, wherein the driving patterns are analyzed to determine the at least one event that includes a day-to-day event.

14. The system of claim 9, wherein determining the at least one demand response overhead percentage includes analyzing the at least one demand response factor associated with the at least one event and determining the at least one demand response overhead percentage for at least one period of time prior to a start of the at least one event.

15. The system of claim 9, wherein determining the at least one demand response overhead percentage includes analyzing the at least one demand response factor associated with the at least one event and determining the at least one demand response overhead percentage for at least one period of time during a duration of the at least one event.

16. The system of claim 9, wherein determining the at least one demand response overhead percentage includes analyzing the at least one demand response factor associated with the at least one event and determining the at least one demand response overhead percentage for at least one period of time after a completion of the at least one event.

17. A non-transitory computer readable storage medium storing instructions that when executed by a computer, which includes a processor, perform a method, the method comprising:
   receiving at least one demand response signal from a utility computing infrastructure, wherein the at least one demand response signal includes electronic data that pertains to at least one demand response overhead pricing scheme that is implemented in at least one location during at least one timeframe;
   analyzing event data that is associated with a plurality of types of day-to-day events and a plurality of types of special events to determine at least one event that is occurring at the at least one location during the at least one timeframe and to determine at least one demand response factor that is associated with the at least one event, wherein the event data is retrieved based on an electronic query of an event database and includes location data, timeframe data, historical data, attendance data, and environmental data associated with the at least one event, wherein the at least one demand response factor includes at least one value that pertains to expected vehicle charging demands to an energy load of at least one energy provider within a surrounding vicinity of the at least one event;
   determining at least one demand response overhead percentage that is applied to a predetermined price of energy during at least one timeframe and with respect to at least one location, wherein the at least one demand response overhead percentage is determined based on the at least one demand factor associated with the at least one event, wherein the at least one demand response overhead percentage is determined to accommodate the at least one demand response overhead pricing scheme within the surrounding vicinity of the at least one event;
   receiving location information from at least one electric vehicle;
   determining that the at least one electric vehicle is to be located within the surrounding vicinity of the at least one event during the at least one timeframe in which the at least one demand response overhead percentage is applied, wherein the determination is based on the received location information; and
   in response to determining that the at least one electric vehicle is to be located within the surrounding vicinity of the at least one event during the at least one timeframe in which the at least one demand response overhead percentage is applied, communicating the demand response overhead percentage to at least one electric vehicle, wherein a display of the at least one electric vehicle is operably controlled to present the demand response overhead percentage through at least one application user interface.

18. The non-transitory computer readable storage medium of claim 17, wherein analyzing the event data to that is populated by organizations, businesses, transportation authorities, entertainment promoters, ticket sale promotors, venue operators, internet search providers, weather data providers, media outlets, sports franchises, and concert providers to determine at least one of: the location data, the timeframe data, the historical data, the attendance data, and the environmental data associated with the at least one event.

* * * * *